United States Patent
Guo et al.

(10) Patent No.: US 12,225,400 B2
(45) Date of Patent: Feb. 11, 2025

(54) BEAM REPORTING METHOD AND RELATED COMMUNICATION APPARATUS

(71) Applicant: MediaTek Singapore Pte. Ltd., Singapore (SG)

(72) Inventors: Yang Guo, Shanghai (CN); Yaochao Liu, Beijing (CN); Mingjun Xu, Beijing (CN); Fei Xu, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 374 days.

(21) Appl. No.: 17/890,255

(22) Filed: Aug. 17, 2022

(65) Prior Publication Data

US 2024/0031851 A1  Jan. 25, 2024

(30) Foreign Application Priority Data

Jul. 20, 2022 (CN) .......................... 202210855708.X (51) Int. Cl.
*H04W 24/10* (2009.01)
*H04B 17/309* (2015.01)
*H04W 16/28* (2009.01)

(52) U.S. Cl.
CPC .......... *H04W 24/10* (2013.01); *H04B 17/309* (2015.01); *H04W 16/28* (2013.01)

(58) Field of Classification Search
CPC .... H04W 24/10; H04W 16/28; H04B 17/309; H04B 7/0695; H04B 7/0617; H04B 7/088
USPC ......................................................... 455/423
See application file for complete search history.

(56) References Cited

U.S. PATENT DOCUMENTS

| | | | |
|---|---|---|---|
| 2018/0191416 A1 | 7/2018 | Palenius | |
| 2018/0288645 A1* | 10/2018 | Lee | H04B 17/382 |
| 2020/0382980 A1* | 12/2020 | Fang | H04W 24/10 |
| 2021/0051554 A1* | 2/2021 | Paladugu | H04W 36/362 |
| 2022/0124590 A1 | 4/2022 | Da Silva | |
| 2022/0231883 A1* | 7/2022 | Chou | H04W 24/10 |

FOREIGN PATENT DOCUMENTS

WO  2022/084955 A1  4/2022

OTHER PUBLICATIONS

Intel Corporation, Enhancements on Multi-Beam Operation, 3GPP TSG RAN WG1 #103-e, R1-2008977, e-Meeting, Oct. 26-Nov. 13, 2020, https://www.3gpp.org/ftp/TSG_RAN/WG1_RL1/TSGR1_103-e/Docs/R1-2008977.zip, pp. 1-16.

* cited by examiner

*Primary Examiner* — Don N Vo
(74) *Attorney, Agent, or Firm* — Winston Hsu (57) ABSTRACT

A method for a beam reporting for a communication apparatus, comprising: receiving a plurality of reference signals (RSs) from a wireless network; taking a measurement on the plurality of RSs, to generate a measurement result; performing a sorting on a plurality of beams according to the measurement result, to generate a plurality of sorted beams; detecting a risk of a ping-pong of beam to be reported according to the plurality of sorted beams to generate a risk result, when each measurement is done; and reporting at least one of the plurality of sorted beams to the wireless network according to the risk result.

24 Claims, 8 Drawing Sheets

BEAM REPORTING METHOD AND RELATED COMMUNICATION APPARATUS

BACKGROUND

The present invention relates to wireless communications, and more particularly, to a beam reporting method and a related communication apparatus.

A user equipment (UE) measures beams of a wireless network side and reports a selected beam to the wireless network side. However, the reported beam may be switched frequently (e.g., ping-pong), when the UE is between the beams and the signal qualities of the beams are similar. Accordingly, beams activated by wireless network side is changed frequently, which is not beneficial for the wireless network side to obtain a proper beam for a downlink (DL) beamforming, and performance of the DL beamforming is degraded. Thus, how to report a beam is an important problem to be solved.

SUMMARY

The present invention therefore provides a beam reporting method and a related communication apparatus.

According to an embodiment of the invention, a method for a beam reporting for a communication apparatus, comprising: receiving a plurality of reference signals (RSs) from a wireless network; taking a measurement on the plurality of RSs, to generate a measurement result; performing a sorting on a plurality of beams according to the measurement result, to generate a plurality of sorted beams; detecting a risk of a ping-pong of beam to be reported according to the plurality of sorted beams to generate a risk result, when each measurement is done; and reporting at least one of the plurality of sorted beams to the wireless network according to the risk result.

According to another embodiment of the invention, a communication apparatus, comprising: an interface circuit; and a processing circuit, coupled to the interface circuit and configured to execute instructions; a storage circuit, coupled to the processing circuit and stores the instructions of: receiving a plurality of reference signals (RSs) from a wireless network; taking a measurement on the plurality of RSs, to generate a measurement result; performing a sorting on a plurality of beams according to the measurement result, to generate a plurality of sorted beams; detecting a risk of a ping-pong of beam to be reported according to the plurality of sorted beams to generate a risk result, when each measurement is done; and reporting at least one of the plurality of sorted beams to the wireless network according to the risk result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
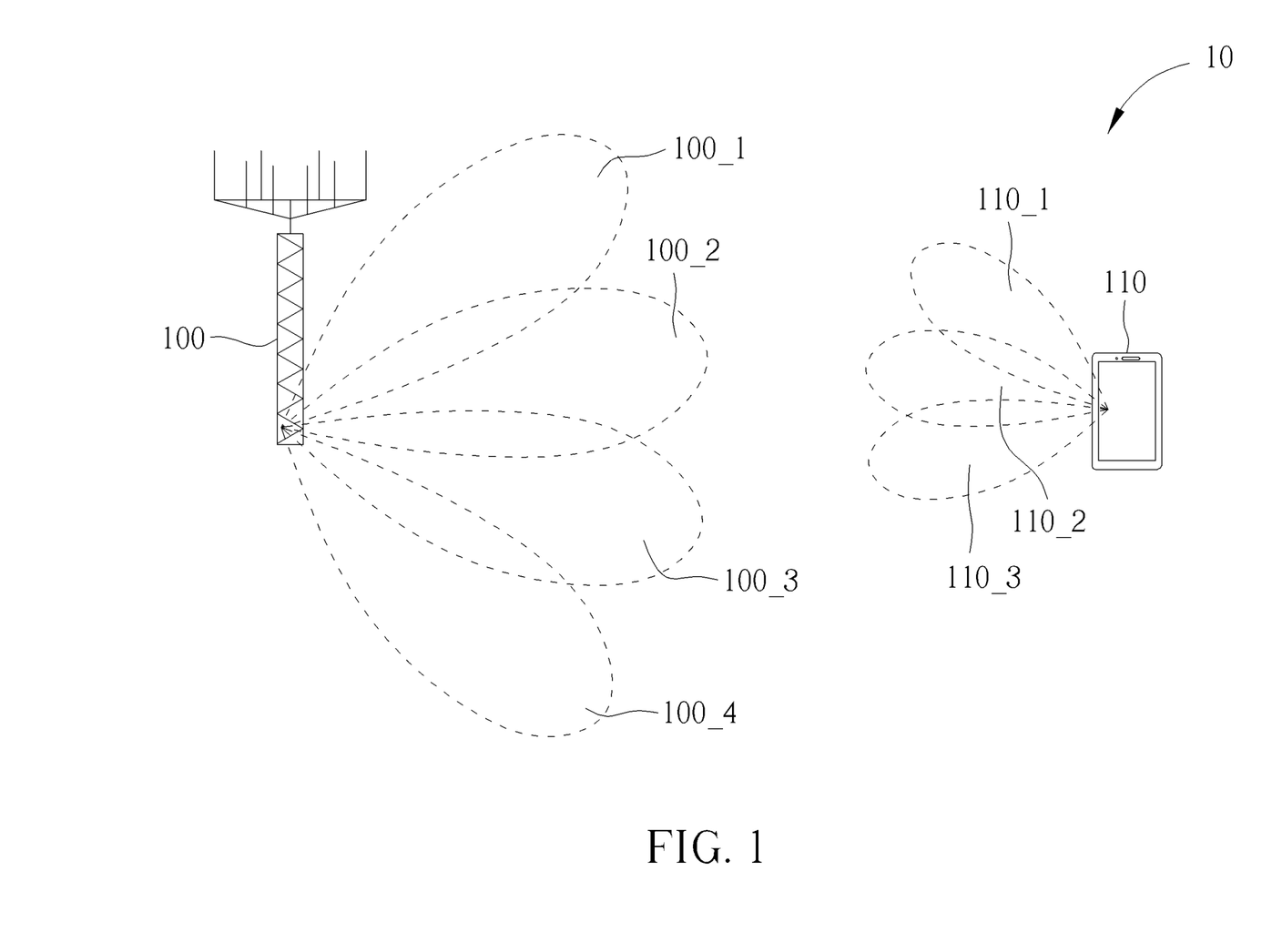
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network side 100 and a communication apparatus 110. The wireless communication system 10 may support a time-division duplexing (TDD) mode, a frequency-division duplexing (FDD) mode, a TDD-FDD joint operation mode, a non-terrestrial network (NTN) mode, a licensed-assisted access (LAA) mode and/or a carrier aggregation (CA). The wireless communication system 10 may support beamformed communication at millimeter-wave (mmWave) frequencies by using at least one transmitting (Tx) beam and/or at least one receiving (Rx) beam. That is, the network side 100 and the communication apparatus 110 may communicate with each other according to wireless signals via multiple beams.

The network side 100 may be a universal terrestrial radio access network (UTRAN) including at least one Node-B (NB), an evolved UTRAN (E-UTRAN) including at least one evolved NB (eNB) in a long term evolution (LTE) system or a LTE-Advanced (LTE-A) system, a next generation radio access network (NG-RAN) including at least one next generation Node-B (gNB), or any BS conforming to a specific communication standard to communicate with the communication apparatus 110. The network side 100 may be any abovementioned BS configured (e.g., directionally) with multiple cells covered by multiple sets of Tx/Rx beams. For example, as shown in FIG. 1, the network side 100 may be a gNB configured with a cell covered by a set of Tx/Rx beams 100_1-100_4.

The network side 100 may also include a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc.

The communication apparatus 110 may be a user equipment (UE), a low cost device, a device-to-device (D2D) communication device, a narrow-band internet of things (IoT) (NB-IoT), a mobile phone, a smart phone, a laptop, a tablet computer, a portable computer system, any suitable device, or combination thereof. The communication apparatus 110 may be any abovementioned device which forms Tx/Rx beams according to (e.g., by applying) beamforming. For example, as shown in FIG. 1, the communication apparatus 110 may be a UE which forms Tx/Rx beams 110_1-110_3 according to beamforming.

In addition, for an uplink (UL) communication, the communication apparatus 110 is the transmitter and the network side 100 is the receiver, and for a downlink (DL) communication, the network side 100 is the transmitter and the communication apparatus 110 is the receiver. In a DL-based beam management (BM) procedure, the network side 100 may provide opportunities for the communication apparatus 110 to measure the beams 100_1-100_4. Accordingly, the communication apparatus 110 measures the beams 100_1-100_4, selects beams with stronger signal qualities and reports the selected beams (e.g., indexes of the selected beams) to the network side 100. Then, the network side 100 obtains a proper (e.g., converged) beam from the beams 100_1-100_4 for the communication apparatus 110 according to the selected beam reported by the communication apparatus 110, and performs a DL (e.g., physical DL shared channel (PDSCH)) beamforming via the proper beam.

Figure 2:
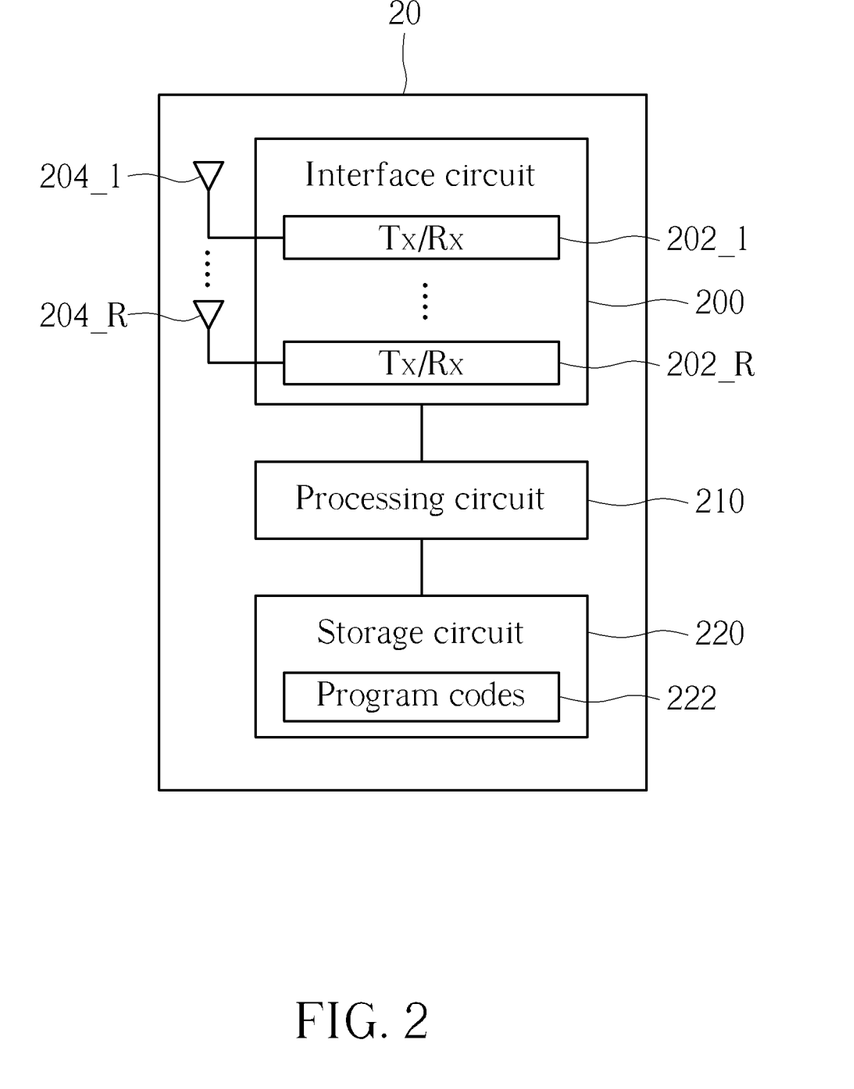
FIG. 2 is a schematic diagram of a communication apparatus according to an example of the present invention.

FIG. 2 is a schematic diagram of a communication apparatus 20 according to an example of the present invention. The communication apparatus 20 may be the network side 100 or the communication apparatus 110 shown in FIG. 1. The communication apparatus 20 may include an interface circuit 200, a processing circuit 210 and a storage circuit 220. The interface circuit 200 may include a plurality of transceivers (e.g., labeled as "TX/RX") 202_1-202_R coupled to a plurality of antennas 204_1-204_R, respectively, where R is a positive integer. The plurality of antennas 204_1-204_N may transmit wireless signals and may receive wireless signals. The plurality of transceivers 202_1-202_R may convert the wireless signals received from the plurality of antennas 204_1-204_R to baseband signals, and may transmit the baseband signals to the processing circuit 210. The plurality of transceivers 202_1-202_R may convert baseband signals received from the processing circuit 210 to wireless signals, and may transmit the wireless signals to the plurality of antennas 204_1-204_R. The processing circuit 210 is coupled to the interface circuit 200, and may be a microprocessor or Application Specific Integrated Circuit (ASIC) for processing the baseband signals received from the interface circuit 200 or program codes 222 stored in the storage circuit 220. The storage circuit 220 is coupled to the processing circuit 210, and may store the program codes 222, accessed and executed by the processing circuit 210.

Figure 3:
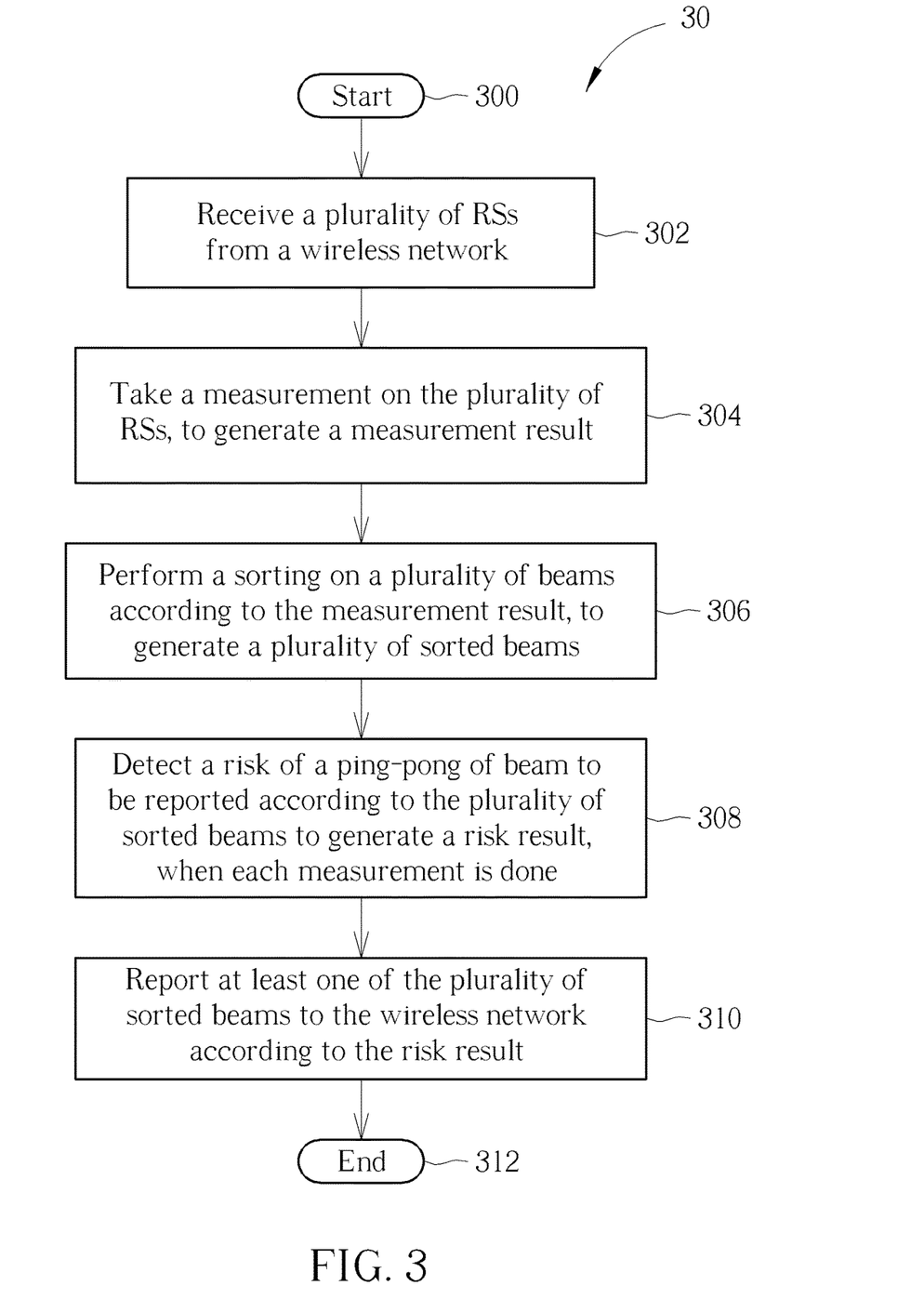
FIG. 3 is a flowchart of a process according to an example of the present invention.

FIG. 3 is a flowchart of a process 30 according to an example of the present invention. The process 30 may be utilized in the communication apparatus 110 in FIG. 1, to perform a beam reporting. The process 30 may be compiled into the program codes 222 and includes the following steps:

Step 300: Start.

Step 302: Receive a plurality of reference signals (RSs) from a wireless network (e.g., the network side 100 in FIG. 1).

Step 304: Take (e.g., perform) a measurement on the plurality of RSs, to generate a measurement result.

Step 306: Perform a sorting on a plurality of beams according to the measurement result, to generate a plurality of sorted beams.

Step 308: Detect a risk of a ping-pong of beam to be reported according to the plurality of sorted beams to generate a risk result, when each measurement is done.

Step 310: Report at least one of the plurality of sorted beams to the wireless network according to the risk result.

Step 312: End.

According to the process 30, before reporting a beam to the wireless network, the communication apparatus 110 detects the risk of the ping-pong of the beam to be reported according to the plurality of sorted beams. That is, the risk of the ping-pong of the beam to be reported is detected and considered by the communication apparatus 110 when reporting the beam to the wireless network.

Realization of the process 30 is not limited to the above description. The following examples may be applied for realizing the process 30.

In one example, the communication apparatus 110 may receive the plurality of RSs from (e.g., configured by) the wireless network in a radio resource control (RRC) message.

In one example, the plurality of beams may be sorted according to (e.g., in the order of) a plurality of signal qualities in the measurement result. That is, the plurality of sorted beams are listed from a beam with the strongest signal quality to a beam with the weakest signal quality. In one example, the signal quality includes a RS received power (RSRP) and/or a signal-to-noise ratio (SNR). In one example, a type of the signal quality includes an instantaneous signal quality, an average signal quality or a filtering quality.

In one example, the risk result may be determined (e.g., generated) according to a set of the plurality of sorted beams. In one example, the set of the plurality of sorted beams may be generated according to a beam with the strongest signal quality of the plurality of sorted beams and a beam with the second strongest signal quality of the plurality of sorted beams.

In one example, the risk result may indicate that there is the risk (e.g., a high risk) of the ping-pong of the beam to be reported or there is not the risk (e.g., a low risk) of the ping-pong of the beam to be reported.

In one example, the communication apparatus 110 may prevent (e.g., avoid) the ping-pong of the beam to be reported according to the plurality of sorted beams at each measurement occasion and a state machine, to generate a ping-pong avoided beam, when the risk result indicates that there is the risk of the ping-pong of the beam to be reported. In another example, the communication apparatus 110 may prevent the ping-pong of the beam to be reported according to the previous sorted beams at each report occasion and a state machine, to generate a ping-pong avoided beam, when the risk result indicates that there is the risk of the ping-pong of the beam to be reported. The state machine may include two states for each of the ping-pong avoided beam, the beam with the strongest signal quality or the beam with the second strongest signal quality. Then, the communication apparatus 110 reports the ping-pong avoided beam to the wireless network. That is, before reporting a beam to the wireless network, the communication apparatus 110 detects the risk of the ping-pong of the beam to be reported according to the plurality of sorted beams and prevents the ping-pong of the beam to be reported. Thus, the ping-pong of the reported beam is prevented, and the performance of the DL beamforming is improved.

In one example, when the risk result indicates that there is not the risk of the ping-pong of the beam to be reported, the communication apparatus 110 may report the beam with the strongest signal quality of the plurality of sorted beams to the wireless network. In one example, the communication apparatus 110 may filter (e.g., averages) a plurality of measurement results for each beam (e.g., each received RS) in a period of time of the past, to generate an averaged measurement result for each beam, and to generate a plurality of averaged measurement results for the plurality of beams. Then, the communication apparatus 110 may report a beam with the strongest average signal quality in the plurality of averaged measurement results to the wireless network, when the risk result indicates that there is not the risk of the ping-pong of the beam to be reported. In one example, the communication apparatus 110 may report a beam according to a RS quality voting (RQV) (e.g., using the last N plurality of sorted beams in the last N measurement occasions, where N is a positive integer), when differences of the plurality of signal qualities are all smaller than a threshold. In detail, the communication apparatus 110 may maintain a RQV box to record the number of times each beam is selected as a beam with the strongest signal quality or a beam with the second strongest signal quality, after each measurement occasion within a segment time window. Then, the communication apparatus 110 may determine to report a beam (e.g., selected as a beam with the strongest signal quality or a beam with the second strongest signal quality the most times) according to a result of the RQV, when the risk result indicates that there is not the risk of the ping-pong of the beam to be reported.

In one example, the method of Step 308 and Step 310 are also applicable to a layer-3 RSRP (L3-RSRP) for a cell level report.

In one example, for an example of Step 308, the communication apparatus 110 may detect the risk of the ping-pong of the beam to be reported according to a transmission configuration indicator (TCI) state. In one example, the TCI state may be activated by the wireless network.

In one example, the communication apparatus 110 may report the at least one of the plurality of sorted beams to the wireless network according to the risk result periodically, semi-persistently or aperiodically.

Figure 4:
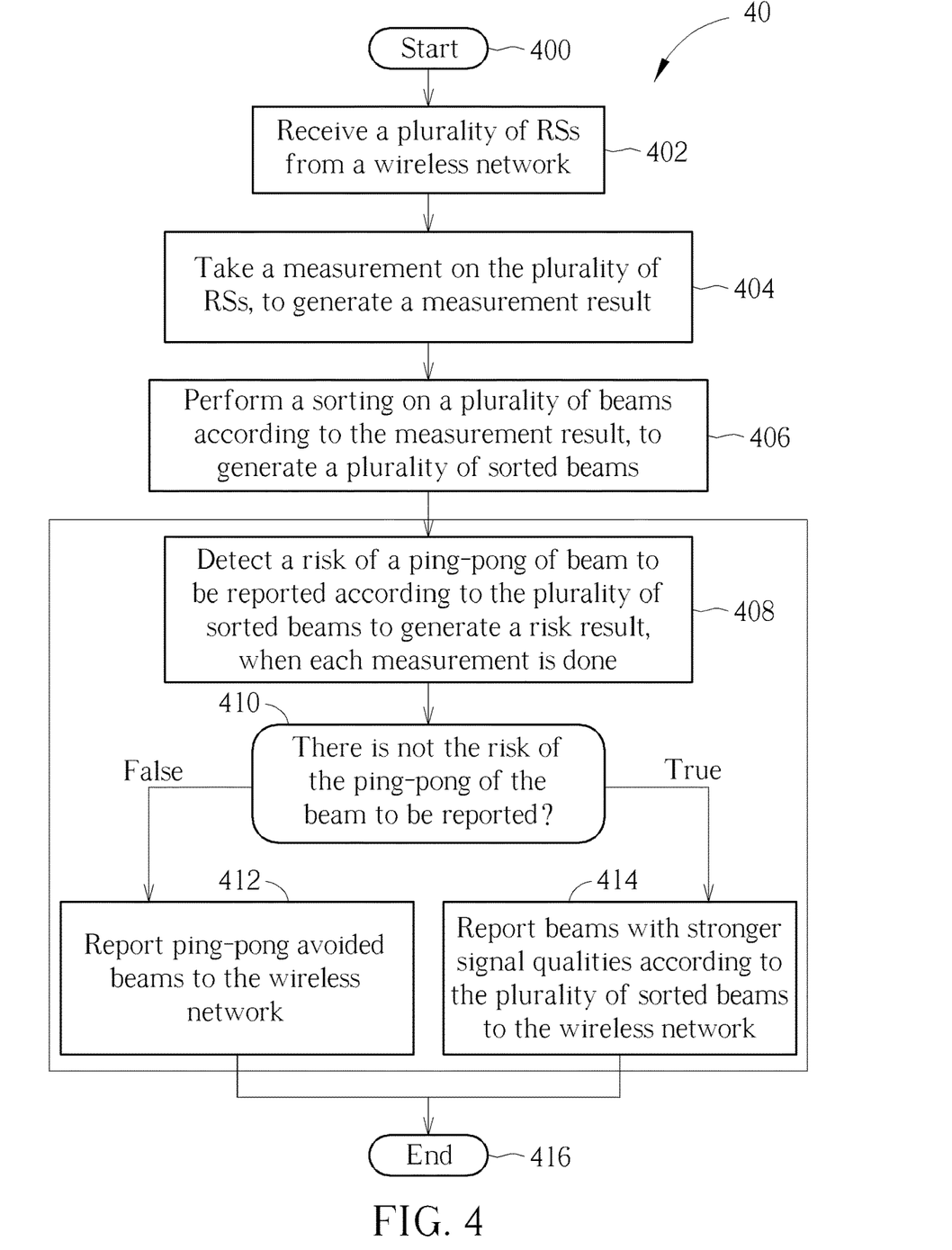
FIG. 4 is a flowchart of a process according to an example of the present invention.

FIG. 4 is a flowchart of a process 40 according to an example of the present invention. The process 40 may be utilized in the communication apparatus 110 in FIG. 1, to perform a beam reporting. The process 40 may be compiled into the program codes 222 and includes the following steps:

Step 400-408: Similar to Step 300-308.

Step 410: Determine whether the risk result indicates that there is not the risk of the ping-pong of the beam to be reported, if the determination is "False", go to Step 412; otherwise, go to Step 414.

Step 412: Report ping-pong avoided beams to the wireless network.

Step 414: Report beams with stronger signal qualities according to the plurality of sorted beams to the wireless network. Step 416: End.

Figure 5:
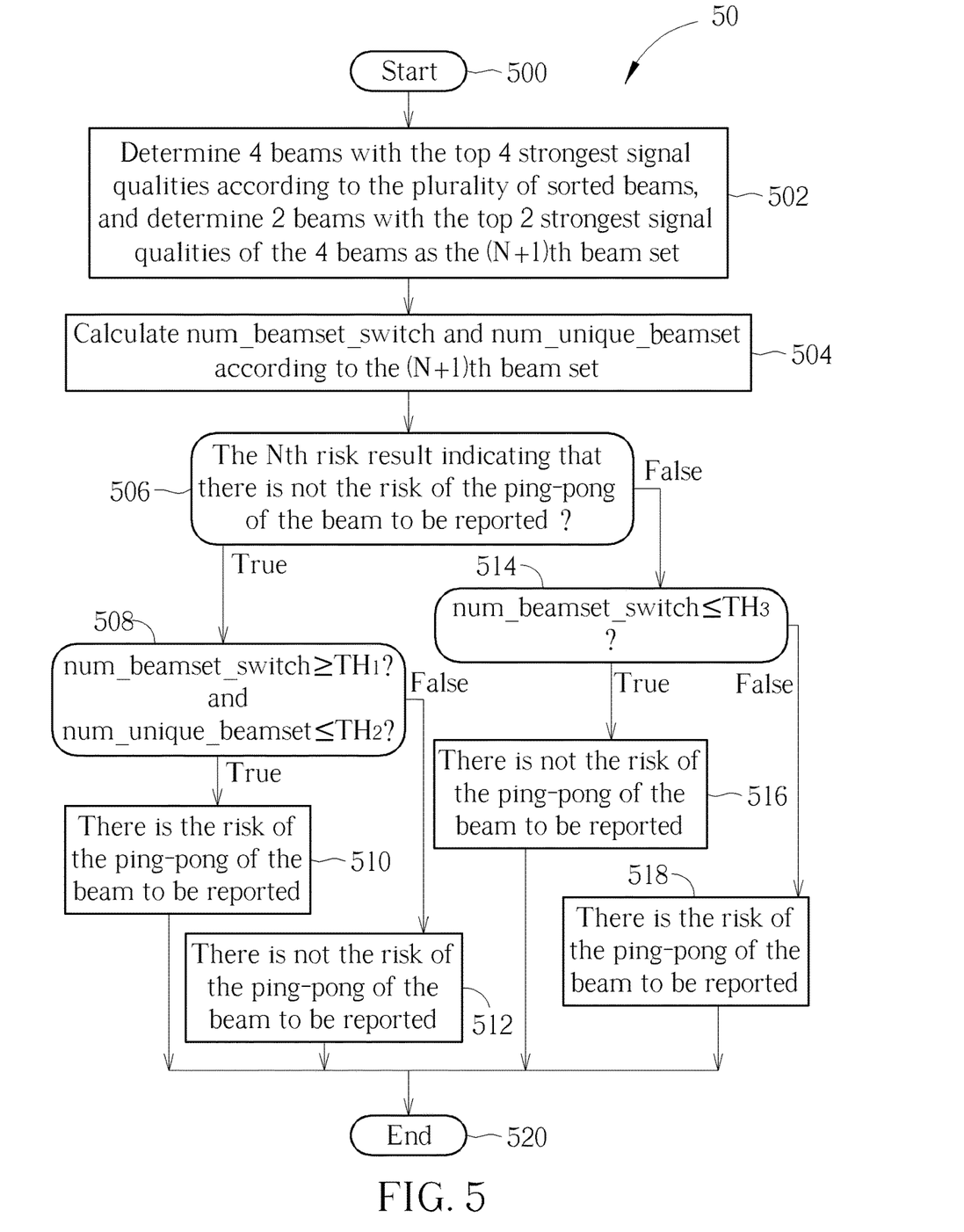
FIG. 5 is a flowchart of a process according to an example of the present invention.

FIG. 5 is a flowchart of a process 50 according to an example of the present invention. The process 50 may be utilized in the communication apparatus 110 in FIG. 1, to detect the risk of the ping-pong of the beam to be reported according to the plurality of sorted beams in the (N+1)th measurement occasion to generate the (N+1)th risk result, wherein each measurement occasion refers to when the communication apparatus 110 receives the plurality of RSs from the wireless network (e.g., Step 302). The process 50 may be compiled into the program codes 222 and includes the following steps:

Step 500: Start.

Step 502: Determine 4 beams with the top 4 strongest signal qualities according to the plurality of sorted beams and determine 2 beams with the top 2 strongest signal qualities of the 4 beams as the (N+1)th beam set.

Step 504: Calculate the number of two adjacent beam sets switching num_beamset_switch and the number of an unique beam set num_unique_beamset in the last N measurement occasions according to the (N+1)th beam set.

Step 506: Determine whether the Nth risk result indicates that there is not the risk of the ping-pong of the beam to be reported, if the determination is "True", go to Step 508; otherwise, go to Step 514.

Step 508: Determine whether num_beamset_switch is greater than or equal to a lower-bound switch threshold $TH_1$, and determine whether num_unique_beamset is smaller than or equal to a beamset threshold $TH_2$, if the determination is "True", go to Step 510; otherwise, go to Step 512.

Step 510: Generate the (N+1)th risk result indicating that there is the risk of the ping-pong of the beam to be reported.

Step 512: Generate the (N+1)th risk result indicating that there is not the risk of the ping-pong of the beam to be reported.

Step 514: Determine whether num_beamset_switch is smaller than or equal to an upper-bound switch threshold $TH_3$, if the determination is "True", go to Step 516; otherwise, go to Step 518.

Step 516: Generate the (N+1)th risk result indicating that there is not the risk of the ping-pong of the beam to be reported.

Step 518: Generate the (N+1)th risk result indicating that there is the risk of the ping-pong of the beam to be reported.

Step 520: End.

Figure 6:
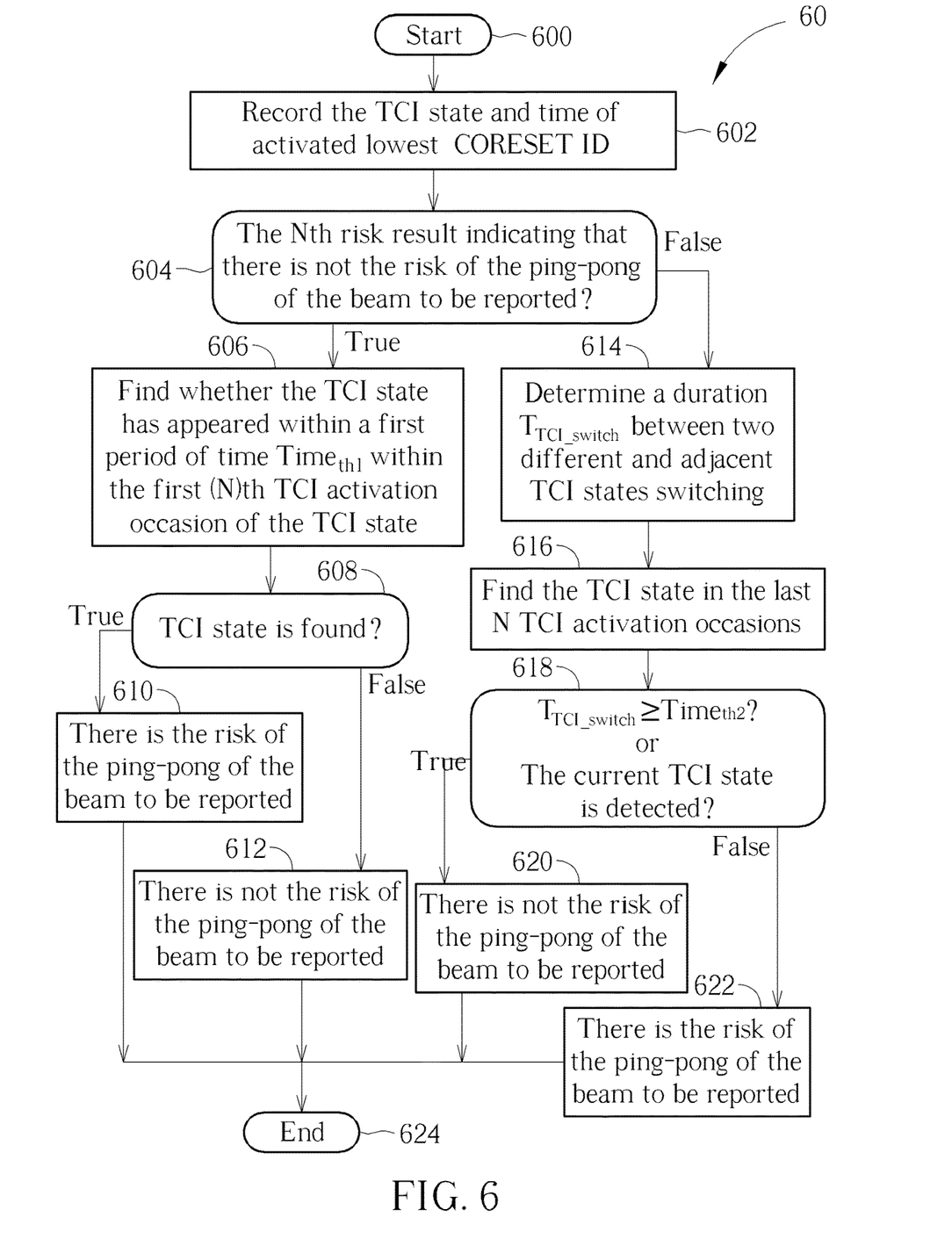
FIG. 6 is a flowchart of a process according to an example of the present invention.

FIG. 6 is a flowchart of a process 60 according to an example of the present invention. The process 60 may be utilized in the communication apparatus 110 in FIG. 1, to detect the risk of the ping-pong of the beam to be reported according to a TCI state in the (N+1)th TCI activation occasion to generate the (N+1)th risk result, wherein each TCI activation occasion refers to when the communication apparatus 110 obtains the TCI state activated by the wireless network. The process 60 may be compiled into the program codes 222 and includes the following steps:

Step 600: Start.

Step 602: Record the TCI state and a time of activated lowest control resource set (CORESET) identity (ID).

Step 604: Determine whether the Nth risk result indicates that there is not the risk of the ping-pong of the beam to be reported, if the determination is "True", go to Step 606; otherwise, go to Step 614.

Step 606: Find whether the (e.g., currently activated) TCI state has appeared within a first period of time $Time_{th1}$ within the first (N)th TCI activation occasion of the (e.g., currently activated) TCI state.

Step 608: Determine whether the TCI state is found in the first period of time $Time_{th1}$, if the determination is "True", go to Step 610; otherwise, go to Step 612.

Step 610: Generate the (N+1)th risk result indicating that there is the risk of the ping-pong of the beam to be reported.

Step 612: Generate the (N+1)th risk result indicating that there is not the risk of the ping-pong of the beam to be reported.

Step 614: Determine a duration $T_{TCI\_switch}$ between two different and adjacent TCI states switching.

Step 616: Find the TCI state in the last N TCI activation occasions.

Step 618: Determine whether $T_{TCI\_switch}$ is greater than a second period of time $Time_{th2}$ or whether the current TCI state is detected to be different from the last N times NW activated TCI state twice consecutively. If the determination is "True", go to Step 620; otherwise, go to Step 622.

Step 620: Generate the (N+1)th risk result indicating that there is not the risk of the ping-pong of the beam to be reported.

Step 622: Generate the (N+1)th risk result indicating that there is the risk of the ping-pong of the beam to be reported.

Step 624: End.

Figure 7:
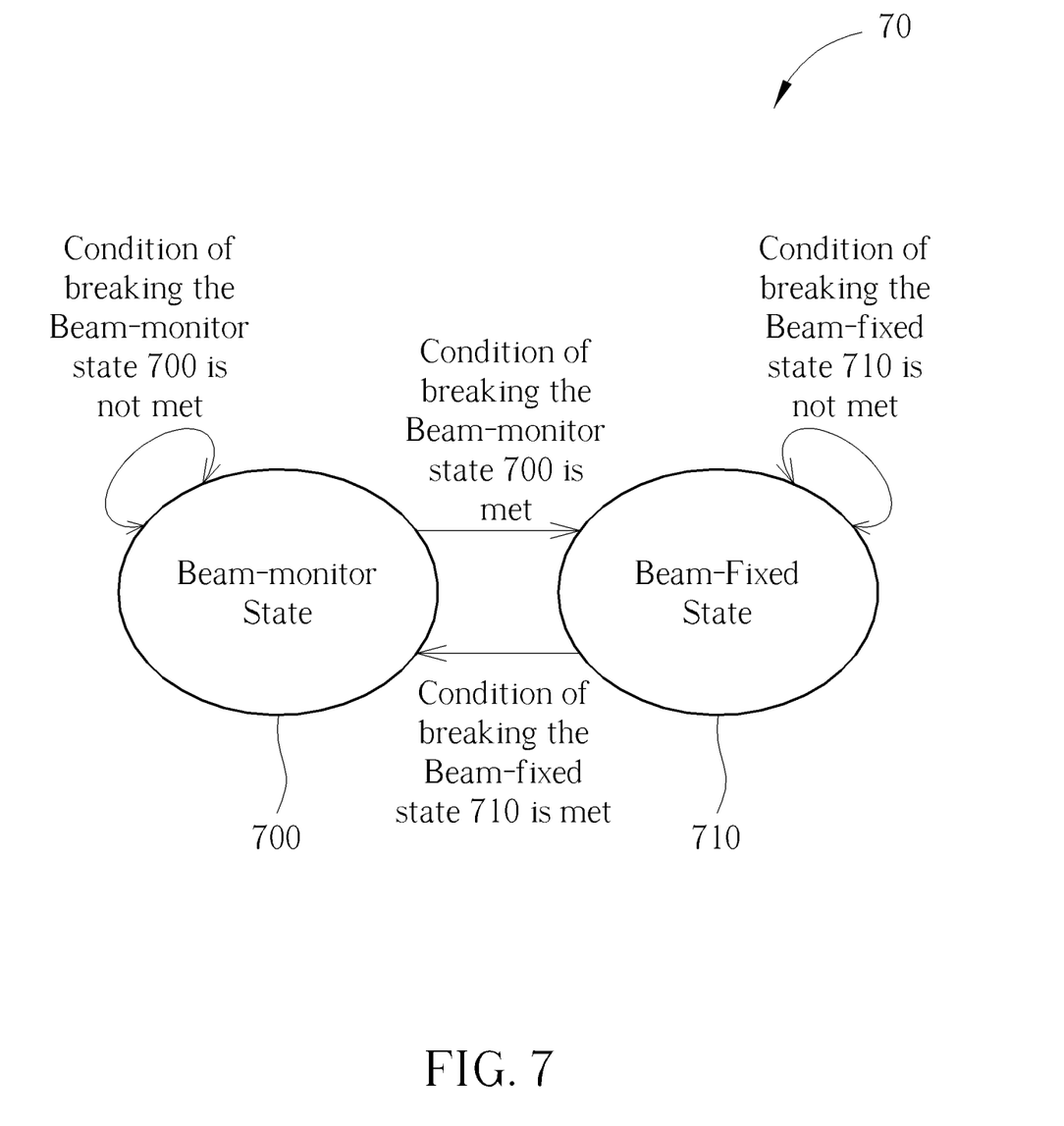
FIG. 7 is a schematic diagram of a state machine according to an example of the present invention.

FIG. 7 is a schematic diagram of a state machine 70 according to an example of the present invention. The state machine 70 includes a beam-monitor state 700 and a beam-fixed state 710. The state machine 70 may be stored (e.g., maintained) in the communication apparatus 110 in FIG. 1, to determine states of the beam with the strongest signal quality in the plurality of sorted beams.

In the beam-monitor state 700, the communication apparatus 110 selects the beam with the strongest signal quality according to the plurality of sorted beams as a reported beam, and monitors whether the reported beam is needed to be fixed. The communication apparatus 110 enters the beam-fixed state 710 from the beam-monitor state 700 when a condition of breaking the beam-monitor state 700 (e.g., fixing the beam) is met. The communication apparatus 110 maintains (e.g., stays) in the beam-monitor state 700 when the condition of breaking the beam-monitor state 700 is not met. In one example, the condition for breaking the beam-monitor state includes when the risk of ping pong of the reported beam occurs; when the strongest beams in the last N measurement occasions are stable; or when a count of a beam with the most times occurred in a beam set is greater than or equal to a strongest-occurrence threshold $SO_{th1}$ during the last N measurement occasions, where the beam set includes the beams selected as beams with the strongest signal qualities in the last N measurement occasions.

In the beam-fixed state 710, the communication apparatus 110 selects a fixed beam in the last N measurement occasions as a reported beam, fixes the reported beam until a condition of breaking the beam-fixed state 710 is met, and monitors whether the condition of breaking the beam-fixed state 710 is met. The communication apparatus 110 enters the beam-monitor state 700 from the beam-fixed state 710 when the condition of breaking the beam-fixed state 710 (e.g., stopping fixing the beam) is met. The communication apparatus 110 maintains in the beam-fixed state 710 when the condition of breaking the beam-fixed state 710 is not met. In one example, the condition for breaking the beam-fixed state includes when a signal quality difference between a beam with the strongest signal quality in the (N+1) th measurement occasion and a fixed beam is greater than a signal quality threshold $Quality_{th1}$ on P consecutive measurement occasions, where P is a positive integer and P≥2; or when a timer for the communication apparatus 110 maintaining in the beam-fixed state 710 is elapsed (e.g., expired).

Figure 8:
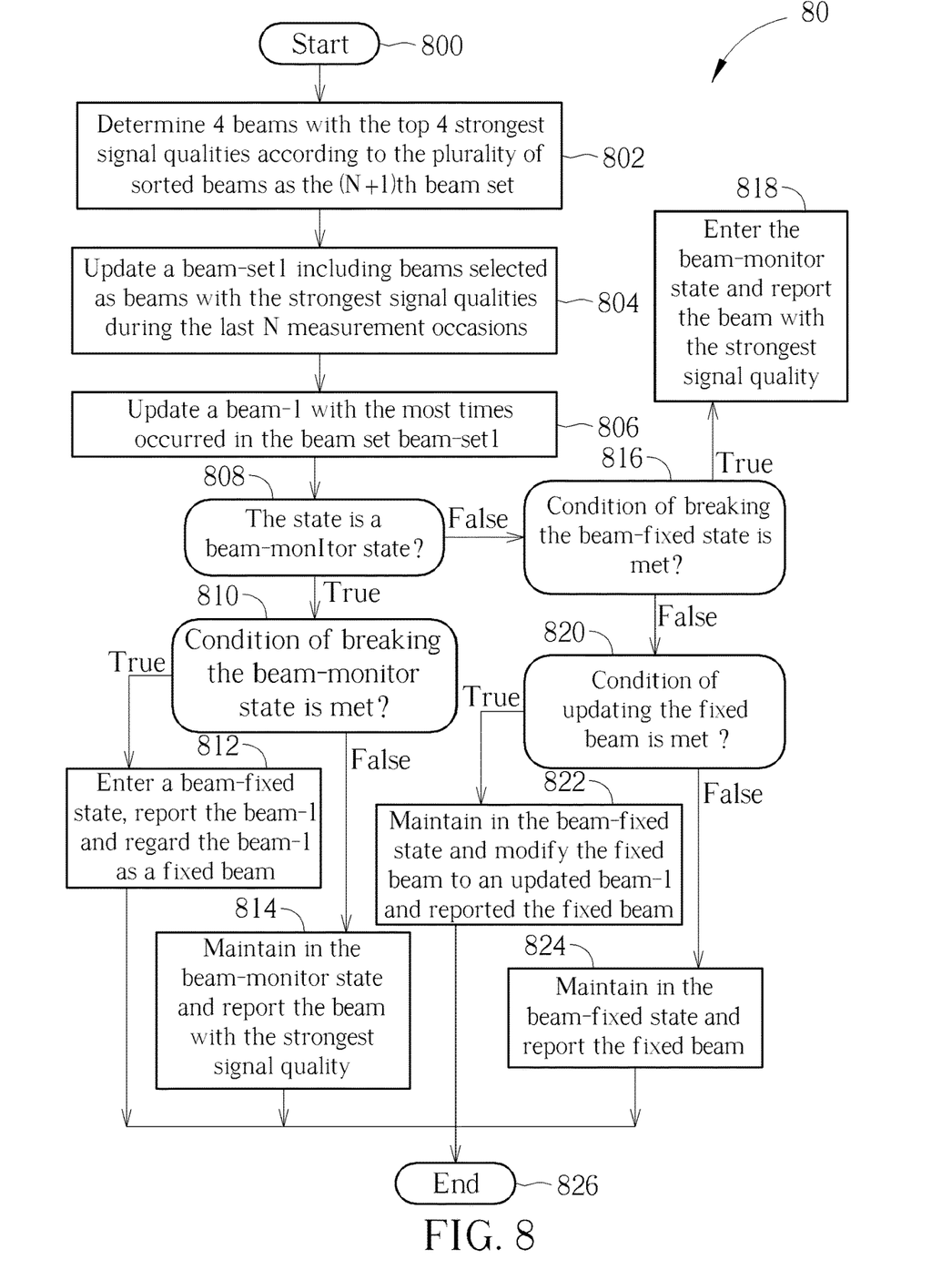
FIG. 8 is a flowchart of a process according to an example of the present invention.

FIG. 8 is a flowchart of a process 80 according to an example of the present invention. The process 80 may be utilized in the communication apparatus 110 in FIG. 1, to report a ping-pong avoided beam to the wireless network in the (N+1)th measurement occasion, wherein each measurement occasion refers to when the communication apparatus 110 receives the plurality of RSs from the wireless network. The process 80 may be compiled into the program codes 222 and includes the following steps:

Step 800: Start.

Step 802: Determine 4 beams with the top 4 strongest signal qualities according to the plurality of sorted beams as the (N+1)th beam set.

Step 804: Update abeam set beam-set1 including beams selected as beams with the strongest signal qualities during the last N measurement occasions.

Step 806: Update a beam beam-1 with the most times occurred in the beam set beam-set1.

Step 808: Determine whether a state of the beam with the strongest signal quality is a beam-monitor state (e.g., the beam-monitor state 700 in FIG. 7), if the determination is "True", goes to Step 810; otherwise, goes to Step 816.

Step 810: Determine whether a condition of breaking the beam-monitor state is met for the beam with the strongest signal quality, if the determination is "True", goes to Step 812; otherwise, goes to Step 814.

Step 812: Enter a beam-fixed state (e.g., the beam-fixed state 710 in FIG. 7), report the beam beam-1 and regard the beam beam-1 as a fixed beam.

Step 814: Maintain in the beam-monitor state and report the beam with the strongest signal quality according to the plurality of sorted beams.

Step 816: Determine whether a condition of breaking the beam-fixed state is met for the beam with the strongest signal quality, if the determination is "True", goes to Step 818; otherwise, goes to Step 820.

Step 818: Enter the beam-monitor state and report the beam with the strongest signal quality according to the plurality of sorted beams.

Step 820: Determine whether a condition of updating the fixed beam is met for the beam with the strongest signal quality, if the determination is "True", goes to Step 822; otherwise, goes to Step 824.

Step 822: Maintain in the beam-fixed state and modify the fixed beam to an updated beam beam-1 and reported the fixed beam.

Step 824: Maintain in the beam-fixed state and report the fixed beam.

Step 826: End.

In one example, the condition of breaking the beam-monitor state in Step 810 may refer to the condition of breaking the beam-monitor state recited in FIG. 7. In one example, the condition of breaking the beam-fixed state in Step 816 may refer to the condition of breaking the beam-fixed state recited in FIG. 7. In one example, a condition of updating the fixed beam is met for the beam with the strongest signal quality includes when the beam beam-1 is different from the fixed beam; when a count of the beam beam-1 is greater than or equal to an strongest-occurrence threshold $SO_{th2}$ during the last N measurement occasions; or when a signal quality differences between the beam beam-1 and the fixed beam in the last N measurement occasions are greater than a signal quality threshold $Quality_{th2}$.

When the wireless network configures the number of reported beams is greater than or equal to 2, reporting a ping-pong avoided beam with the second strongest signal quality is similar to reporting the ping-pong avoided beam with the strongest signal quality described as described in the process 80. For example, when the wireless network configures the number of the reported beams is equal to 2, the beam with the strongest signal quality in the process 80 may be replaced by a beam with the second strongest signal quality, the beam set beam-set1 in the process 80 may be replaced by a beam set beam-set2 includes beams selected as beams with the second strongest signal qualities during the last N measurement occasions, and the beam beam-1 in the process 80 may be replaced by a beam beam-2 with the most times occurred in the beam set beam-set2. Accordingly, the communication apparatus 110 reports the ping-pong avoided beams with the first strongest signal quality and the second strongest signal quality according to the plurality of the sorted beams to the wireless network in the (N+1)th measurement occasion. In another embodiment, when the risk result indicates that there is no ping-pong risk for the beam to be reported, the top K beams with the strongest signal quality among the plurality of sorted beams are reported to the wireless network according to the number K of beams required to be reported by the wireless network, wherein K is a positive integer greater than or equal to 1.

Details and modifications of the processes 30-80 may be referred to the above description and examples, and are not repeated herein.

To sum up, the proposed description or examples pertain to a beam reporting, the abovementioned performance degradation of the DL beamforming can be solved.

Detailed embodiments and implementations have been described above in the specification and thus are omitted here for brevity. Reference may be made to the above sections.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a beam reporting for a communication apparatus, comprising:
    receiving a plurality of reference signals (RSs) from a wireless network;
    taking a measurement on the plurality of RSs, to generate a measurement result;
    performing a sorting on a plurality of beams according to the measurement result, to generate a plurality of sorted beams;
    detecting a risk of a ping-pong of beam to be reported according to the plurality of sorted beams to generate a risk result, when each measurement is done; and
    reporting at least one of the plurality of sorted beams to the wireless network according to the risk result.

2. The method of claim 1, wherein the plurality of beams are sorted according to a plurality of signal qualities in the measurement result.

3. The method of claim 1, wherein the signal quality comprises at least one of a RS received power (RSRP) or a signal-noise-ratio (SNR).

4. The method of claim 1, wherein a type of the signal quality comprises an instantaneous signal quality, an average signal quality or a filtering quality.

5. The method of claim 1, wherein the risk result is determined according to a set of the plurality of sorted beams.

6. The method of claim 5, wherein the set of the plurality of sorted beams is generated according to a beam with the strongest signal quality of the plurality of sorted beams and a beam with the second strongest signal quality of the plurality of sorted beams.

7. The method of claim 1, wherein the risk result indicates that there is the risk of the ping-pong of the beam to be reported or there is not the risk of the ping-pong of the beam to be reported.

8. The method of claim 7, wherein the method further comprises:
    preventing the ping-pong of the beam to be reported according to the plurality of sorted beams and a state machine to generate a ping-pong avoided beam, when the risk result indicates that there is the risk of the ping-pong of the beam to be reported; and
    reporting the ping-pong avoided beam to the wireless network.

9. The method of claim 8, wherein the state machine comprises two states for the ping-pong avoided beam.

10. The method of claim 7, wherein the method further comprises:
    reporting top K beams with the strongest signal quality of the plurality of sorted beams to the wireless network, according to the number K of beams required to be reported by the wireless network, when the risk result indicates that there is not the risk of the ping-pong of the beam to be reported.

11. The method of claim 1, wherein the method further comprises:
    detecting that the risk of the ping-pong of the beam to be reported according to a transmission configuration indicator (TCI) state, to generate the risk result.

12. The method of claim 11, wherein the TCI state is activated by the wireless network.

13. A communication apparatus, comprising:
    an interface circuit;
    a processing circuit, coupled to the interface circuit and configured to execute instructions; and
    a storage circuit, coupled to the processing circuit and stores the instructions of:
        receiving a plurality of reference signals (RSs) from a wireless network;
        taking a measurement on the plurality of RSs, to generate a measurement result;
        performing a sorting on a plurality of beams according to the measurement result, to generate a plurality of sorted beams;
        detecting a risk of a ping-pong of beam to be reported according to the plurality of sorted beams to generate a risk result, when each measurement is done; and
        reporting at least one of the plurality of sorted beams to the wireless network according to the risk result.

14. The communication apparatus of claim 13, wherein the plurality of beams are sorted according to a plurality of signal qualities in the measurement result.

15. The communication apparatus of claim 13, wherein the signal quality comprises at least one of a RS received power (RSRP) or a signal-noise-ratio (SNR).

16. The communication apparatus of claim 13, wherein a type of the signal quality comprises an instantaneous signal quality, an average signal quality or a filtering quality.

17. The communication apparatus of claim 13, wherein the risk result is determined according to a set of the plurality of sorted beams.

18. The communication apparatus of claim 17, wherein the set of the plurality of sorted beams is generated according to a beam with the strongest signal quality of the plurality of sorted beams and a beam with the second strongest signal quality of the plurality of sorted beams.

19. The communication apparatus of claim 13, wherein the risk result indicates that there is the risk of the ping-pong of the beam to be reported or there is not the risk of the ping-pong of the beam to be reported.

20. The communication apparatus of claim 19, wherein the method further comprises:
    preventing the ping-pong of the beam to be reported according to the plurality of sorted beams and a state machine to generate a ping-pong avoided beam, when the risk result indicates that there is the risk of the ping-pong of the beam to be reported; and
    reporting the ping-pong avoided beam to the wireless network.

21. The communication apparatus of claim 20, wherein the state machine comprises two states for the ping-pong avoided beam.

22. The communication apparatus of claim 19, wherein the method further comprises:
    reporting top K beams with the strongest signal quality of the plurality of sorted beams to the wireless network, according to the number K of beams required to be reported by the wireless network, when the risk result indicates that there is not the risk of the ping-pong of the beam to be reported.

23. The communication apparatus of claim 13, wherein the method further comprises:

detecting that the risk of the ping-pong of the beam to be reported according to a transmission configuration indicator (TCI) state, to generate the risk result.

24. The communication apparatus of claim 23, wherein the TCI state is activated by the wireless network.

* * * * *